(12) United States Patent
Ahn et al.

(10) Patent No.: US 11,271,231 B2
(45) Date of Patent: Mar. 8, 2022

(54) APPARATUS AND METHOD FOR CONTROLLING COOLING OF FUEL CELL-BASED GENERATOR SYSTEM

(71) Applicants: Hyundai Motor Company, Seoul (KR); Kia Motors Corporation, Seoul (KR)

(72) Inventors: Deuk Kuen Ahn, Gyeonggi-do (KR); Seon Jong Kang, Chungcheongbuk-do (KR); Hyun Jae Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/015,835

(22) Filed: Sep. 9, 2020

(65) Prior Publication Data
US 2021/0336282 A1    Oct. 28, 2021

(30) Foreign Application Priority Data

Apr. 27, 2020    (KR) .................. 10-2020-0050543

(51) Int. Cl.
| | |
|---|---|
| *H01M 8/04* | (2016.01) |
| *H01M 8/04701* | (2016.01) |
| *H01M 8/04664* | (2016.01) |
| *H01M 8/0432* | (2016.01) |
| *H01M 8/04029* | (2016.01) |

(52) U.S. Cl.
CPC ... *H01M 8/04723* (2013.01); *H01M 8/04029* (2013.01); *H01M 8/04358* (2013.01); *H01M 8/04664* (2013.01)

(58) Field of Classification Search
CPC ......... H01M 8/04029; H01M 8/04358; H01M 8/04664; H01M 8/04723; H01M 8/249
See application file for complete search history.

(56) References Cited

U.S. PATENT DOCUMENTS

| | | | | |
|---|---|---|---|---|
| 2008/0145729 | A1* | 6/2008 | Alp .................. | H01M 8/249 429/434 |
| 2015/0017559 | A1* | 1/2015 | Klewer ............. | H01M 8/04067 429/435 |
| 2021/0119234 | A1* | 4/2021 | Farhat .................. | G05B 19/02 |

FOREIGN PATENT DOCUMENTS

| | | |
|---|---|---|
| KR | 100837975 B1 | 6/2008 |
| KR | 101261923 B1 | 5/2013 |

* cited by examiner

*Primary Examiner* — Brittany L Raymond
(74) *Attorney, Agent, or Firm* — Mintz Levin Cohn Ferris Glovsky and Popeo, P.C.; Peter F. Corless (57) ABSTRACT

An apparatus for controlling cooling of a fuel cell-based generator system is provided. The apparatus includes a first valve disposed between an individual cooling-water line of a first fuel cell system and a common cooling-water line and a first valve driver that opens and closes the first valve. A second valve is disposed between an individual cooling-water line of a second fuel cell system and the common cooling-water line and a second valve driver opens and closes the second valve. A controller determines whether a cooling-water temperature of the first fuel cell system exceeds a reference value, and opens the first valve and the second valve so that cooling-water for the second fuel cell system flows into the first fuel cell system, when the cooling-water temperature of the first fuel cell system exceeds the reference value.

10 Claims, 4 Drawing Sheets

APPARATUS AND METHOD FOR CONTROLLING COOLING OF FUEL CELL-BASED GENERATOR SYSTEM

CROSS-REFERENCE TO RELATED APPLICATION

This application claims the benefit of priority to Korean Patent Application No. 10-2020-0050543, filed on Apr. 27, 2020, the entire contents of which are incorporated herein by reference.

TECHNICAL FIELD

The present disclosure relates to a technique for controlling a cooling-water temperature of each of fuel cell stacks forming a fuel cell-based generator system.

BACKGROUND

In general, a fuel cell system does not convert chemical energy of fuel into heat via combustion. Rather, the fuel cell system directly converts chemical energy into electrical energy electrochemically in the fuel cell stack. This fuel cell system may include a fuel cell stack that generates electrical energy, a hydrogen supply apparatus configured to supply hydrogen as fuel to the fuel cell stack, an air supply apparatus configured to supply air (oxygen) as an oxidant required for an electrochemical reaction to the fuel cell stack, a thermal management system (TMS) configured to discharge a reaction heat of the fuel cell stack to an outside of the system and adjust an operation temperature of the fuel cell stack, and a fuel cell controller configured to execute an overall operation of the fuel management system.

The fuel cell stack refers to a collection of electricity generation units in which a plurality of unit cells are continuously arranged, and each unit cell is configured to generate electrical energy via an electrochemical reaction of hydrogen and air. The hydrogen supply apparatus includes a hydrogen tank, a high pressure/low pressure regulator, a hydrogen recirculating device, and the like. The air supply apparatus includes an air blower, a humidifier, etc. The thermal management system includes a cooling-water pump, a temperature adjustment valve, etc.

High pressure hydrogen supplied from the hydrogen tank is supplied to the fuel cell stack at a low pressure through the high pressure/low pressure regulator. The hydrogen recirculation device includes a recirculation blower installed on a recirculation line and recirculates remaining unreacted hydrogen at an anode of the stack back to the anode using the blower. While the thy air supplied by the air blower passes through the humidifier, the air is humidified due to moisture exchange with an exhaust gas (wet air) discharged from a cathode outlet of the stack and then supplied to a cathode inlet of the fuel cell stack.

The fuel cell system having such a configuration generates electricity via reacting between hydrogen in fuel and oxygen in air, and discharges heat and water as reaction by-products. Further, it is necessary to maintain an appropriate temperature for efficient fuel cell reaction of the fuel cell stack. Accordingly, the fuel cell system includes the thermal management system that cools the fuel cell stack via circulating of cooling-water and a cooling system that cools the cooling-water heated by the fuel cell stack. In this connection, the cooling system may include a radiator and a cooling fan.

The fuel cell system and the cooling system form a single power module. A plurality of power generation modules are connected to each other in parallel to form the fuel cell-based generator system. In a conventional fuel cell-based generator system, when a cooling-water temperature in a specific power generation module exceeds a reference value (e.g., in an event of a failure of the cooling system or a failure of the thermal management system), there is no way in which a fuel cell stack in the specific power generation module is cooled, and, thus, an operation of the specific power generation module has to be stopped. Accordingly, when a cooling-water temperature of a first fuel cell system among a plurality of fuel cell systems constituting a fuel cell-based generator system exceeds the reference value, a method is required to lower the cooling-water temperature of the first fuel cell system using cooling-water of a second fuel cell system.

The matters described in this section are written to improve understanding of the background of the disclosure, and may include matters other than matters in a prior art that are already known to those of ordinary skill in the field to which this technology belongs.

SUMMARY

The present disclosure has been made to solve the above-mentioned problems occurring in the prior art while advantages achieved by the prior art are maintained intact. An aspect of the present disclosure provides an apparatus and a method for controlling cooling of a fuel cell-based generator system, in which individual cooling-water lines of cooling systems forming the fuel cell-based generator system may be connected to a common cooling-water line, and a valve may be disposed between the individual cooling-water line and the common cooling-water line, and thus, when necessary, cooling-waters of the cooling systems are commonly used, such that even when a cooling-water temperature of a first fuel cell system exceeds a reference value, the first fuel cell system may be cooled using cooling-water of a second fuel cell system.

The purposes of the present disclosure are not limited to the purposes mentioned above. Other objectives and advantages of the present disclosure not mentioned may be understood by following descriptions and will be made clearer with reference to embodiments of the present disclosure. In addition, it will be readily appreciated that the objectives and advantages of the present disclosure may be realized by means of the claims and combinations thereof.

According to an aspect of the present disclosure, an apparatus for controlling cooling of a fuel cell-based generator system may include a first valve disposed between an individual cooling-water line of a first fuel cell system and a common cooling-water line, a first valve driver configured to open and close the first valve, a second valve disposed between an individual cooling-water line of a second fuel cell system and the common cooling-water line, a second valve driver configured to open and close the second valve, and a controller configured to determine whether a cooling-water temperature of the first fuel cell system exceeds a reference value, and open the first valve and the second valve to allow cooling-water for the second fuel cell system to flow into the first fuel cell system, in response to determining that the cooling-water temperature of the first fuel cell system exceeds the reference value.

In one exemplary embodiment, the controller may be configured to normally maintain the first valve and the second valve in a closed state. In response to determining that the cooling-water temperature of the first fuel cell system exceeds the reference value, the controller may be configured to determine whether to open the first valve and the second valve based on a diagnosis result about a cooling failure of the first fuel cell system. In response to determining that the cooling failure occurs in the first fuel cell system, the controller may be configured to open the first valve and the second valve.

Additionally, in response to determining that the cooling failure does not occur in the first fuel cell system, the controller may be configured to transmit a maximum cooling control signal to the first fuel cell system. The controller may be configured to receive the cooling failure diagnosis result from the first fuel cell system. Additionally, the controller may be configured to directly diagnose the cooling failure of the first fuel cell system. In one exemplary embodiment, the controller may be configured to determine whether a cooling-water temperature of the second fuel cell system exceeds a reference value. In response to determining that the cooling-water temperature of the second fuel cell system exceeds the reference value, the controller may be configured to open the first valve and the second valve to allow cooling-water for the first fuel cell system to flow into the second fuel cell system.

According to another aspect of the present disclosure, method for controlling cooling of a fuel cell-based generator system may include monitoring a cooling-water temperature of each of a first fuel cell system and a second fuel cell system forming the fuel cell-based generator system, maintaining a closed state of a first valve located between an individual cooling-water line of the first fuel cell system and a common cooling-water line, and a closed state of a second valve disposed between an individual cooling-water line of the second fuel cell system and the common cooling-water line, in response to determining the cooling-water temperature of the first fuel cell system does not exceed a reference value, and opening the first valve and the second valve to allow cooling-water for the second fuel cell system to flow into the first fuel cell system in response to determining that the cooling-water temperature of the first fuel cell system exceeds the reference value.

In one exemplary embodiment, the opening of the first valve and the second valve may include determining whether the first fuel cell system has a cooling failure, opening the first valve and the second valve in response to determining that the cooling failure occurs in the first fuel cell system, and transmitting a maximum cooling control signal to the first fuel cell system in response to determining that the cooling failure does not occur in the first fuel cell system. In addition, the opening of the first valve and the second valve may include receiving the cooling failure diagnosis result from the first fuel cell system. The opening of the first valve and the second valve may include directly diagnosing the cooling failure of the first fuel cell system.

According to another aspect of the present disclosure, a method for controlling cooling of a fuel cell-based generator system may include monitoring a cooling-water temperature of each of a first fuel cell system and a second fuel cell system forming the fuel cell-based generator system, maintaining a closed state of a first valve located between an individual cooling-water line of the first fuel cell system and a common cooling-water line, and a closed state of a second valve disposed between an individual cooling-water line of the second fuel cell system and the common cooling-water line, in response to determining that the cooling-water temperature of the second fuel cell system does not exceed a reference value, and opening the first valve and the second valve to allow cooling-water for the first fuel cell system to flow into the second fuel cell system in response to determining the cooling-water temperature of the second fuel cell system exceeds the reference value.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some embodiments of the present disclosure will be described in detail with reference to the exemplary drawings. It should be noted that in adding reference numerals to components of the drawings, the same or equivalent components are designated by the same numeral even when they are present on different drawings. Further, in describing an exemplary embodiment of the present disclosure, a detailed description of a related known component or function will be omitted when it is determined that the description interferes with understanding of the embodiment of the present disclosure.

In describing components of an embodiment according to the present disclosure, terms such as first, second, A, B, (a), (b), and the like may be used. These terms are merely intended to distinguish between the components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
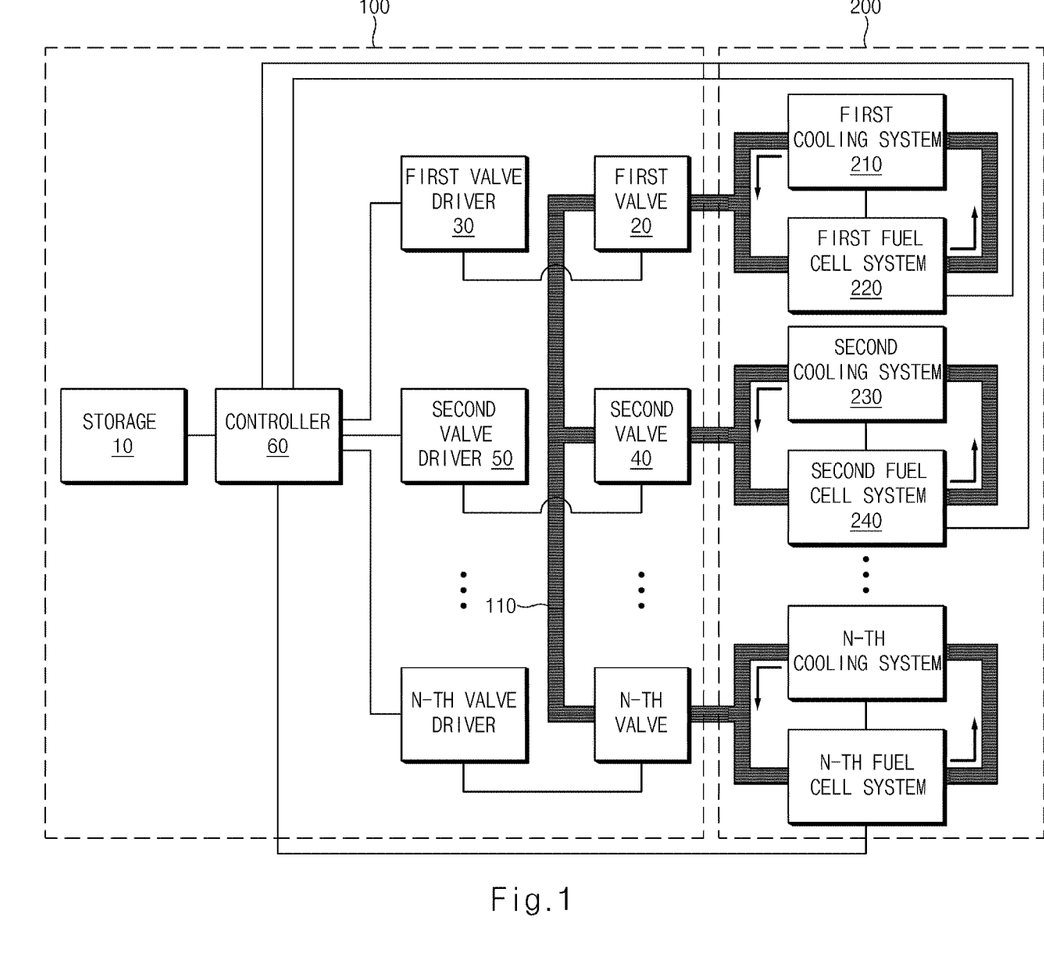
FIG. 1 is a block diagram of an apparatus for controlling cooling of a fuel cell-based generator system according to an exemplary embodiment of the present disclosure.

FIG. 1 is a block diagram of an apparatus for controlling cooling of a fuel cell-based generator system according to an exemplary embodiment of the present disclosure. As shown in FIG. 1, an apparatus 100 for controlling cooling of a fuel cell-based generator system according to an exemplary embodiment of the present disclosure may include storage 10, a first valve 20, a first valve driver 30, a second valve 40, a second valve driver 50, and a controller 60. In this connection, the components may be combined with each other into a single component according to a scheme of operating the apparatus 100 for controlling cooling of the fuel cell-based generator system according to an exemplary embodiment of the present disclosure. Some components may be omitted.

First, the storage 10 may be configured to store various logics, algorithms and programs required in a process of commonly using the cooling-waters of the cooling systems, when necessary in a state in which individual cooling-water lines of cooling systems forming a fuel cell-based generator system 200 are connected to a common cooling-water line, and a valve may be disposed between the individual cooling-water line and the common cooling-water line. The storage 10 may be configured to store a reference value required when directly diagnosing a failure of each fuel cell system. The reference value may include a thermal management system (TMS) pressure value (in one example, about 110 kpa), a cooling-water pump revolutions per minute (RPM) (in one example, about 500), a radiator input/output temperature difference (in one example, about 2° C.), and a fan RPM (in one example, about 500), etc.

The storage 10 may include at least one storage medium selected from a flash memory type memory, a hard disk type memory, a micro type memory, and a card type memory (e.g., a SD card (Secure Digital Card) or an XD card (eXtream Digital Card), RAM (Random Access Memory), SRAM (Static RAM), ROM (Read-Only Memory), PROM (Programmable ROM), EEPROM (Electrically Erasable PROM), MRAM (Magnetic RAM), a magnetic disk type memory, and an optical disk type memory.

The first valve 20 may allow or disallow of flow of cooling-water of a first fuel cell system 220 into a common cooling-water line 110. The first valve driver 30 may include a first motor (not shown), and may be configured to open and close the first valve 20 under operation of the controller 60. The second valve 40 may allow or disallow flow of cooling-water of a second fuel cell system 240 into the common cooling-water line 110. The second valve driver 50 may include a second motor (not shown), and may be configured to open and close the second valve 40 under the operation of the controller 60.

The controller 60 may be configured to perform an overall control so that each of the components may perform a function normally. The controller 60 may be implemented in a form of hardware, software, or a combination of hardware and software. In particular, the controller 60 may be implemented as a microprocessor, but is not limited thereto. The controller 60 may be configured to perform various controls so that the cooling-waters of the cooling systems may be used commonly in a state in which the individual cooling-water lines of the cooling systems Raining the fuel cell-based generator system 200 are connected to the common cooling-water line, and each valve may be disposed between the individual cooling-water line and the common cooling-water line.

The controller 60 normally maintains the first valve 20 and the second valve 40 in a closed sate, such that the cooling-water of the first fuel cell system 220 and the cooling-water of the second fuel cell system 240 are prevented from flowing into the common cooling-water line. When a cooling-water temperature of the first fuel cell system 220 exceeds a reference value (in one example, about 90° C.), the controller 60 may be configured to open the first valve 20 and the second valve 40 to allow the cooling-water of the second fuel cell system 240 to flow into the first fuel cell system 220. In this connection, the controller 60 may be configured to obtain the cooling-water temperature of the first fuel cell system 220 from a FCU (Fuel cell Control Unit) of the first fuel cell system 220. The FCU of the first fuel cell system 220 may be configured to operate a first cooling system 210.

When the cooling-water temperature of the second fuel cell system 240 exceeds a reference value (in one example, about 300° C.), the controller 60 may be configured to open the first valve 20 and the second valve 40 to allow the cooling-water of the first fuel cell system 220 to flow into the second fuel cell system 240. In this connection, the controller 60 may be configured to obtain the cooling-water temperature of the second fuel cell system 240 from a FCU (Fuel cell Control Unit) of the second fuel cell system 240. The FCU of the second fuel cell system 240 may be configured to operate a second cooling system 230. When the cooling-water temperature of the second fuel cell system 240 exceeds the reference value (in one example, about 300° C.), the controller 60 may be configured to open the second valve 40 and a third valve (not shown) to allow cooling-water of the third fuel cell system (not shown) to flow into the second fuel cell system 240.

In principal, in response to determining that a cooling-water temperature of a (N−1)-th fuel cell system exceeds a reference value, the controller 60 may be configured to open a (N−1)-th valve and a (N−2)-th valve to allow cooling-water of a (N−2)-th fuel cell system to flow into the (N−1)-th fuel cell system or may be configured to open the (N−1)-th valve and a N-th valve to allow cooling-water of a N-th fuel cell system to flow into the (N−1)-th fuel cell system. In another example, the controller 60 may be configured to open both the (N−2)-th valve and the N-th valve. In one example, in response to determining that the cooling-water temperature of the first fuel cell system 220 exceeds the reference value (in one example, about 300° C.), the controller 60 may be configured to receive cooling failure information (diagnostic code) from the first fuel cell system 220, and then may open the first valve 20 and the second valve 40 to allow cooling-water of the second fuel cell system 240 to flow into the first fuel cell system 220.

In response to determining that the cooling-water temperature of the first fuel cell system 220 exceeds the reference value (in one example, about 300° C.), the controller 60 may be configured to determine whether to open the first valve 20 and the second valve 40, based on a failure diagnosis result of the thermal management system and the cooling system. In this connection, the controller 60 may be configured to open the first valve 20 and the second valve 40 when a failure occurs in the thermal management system or the cooling system. When the controller 60 diagnoses a malfunction of the thermal management system (TMS), it may be diagnosed that a failure has occurred in the thermal management system when a TMS pressure is less than a reference value α or a RPM of a cooling-water pump is less than a reference value γ.

In response to the controller 60 diagnosing a malfunction of the cooling system, the controller 60 may be configured to diagnose that a failure has occurred in the cooling system when a difference between input and output temperatures of the radiator is less than a reference value δ or a RPM of the fan is less than a reference value ε. When the cooling-water temperature of the first fuel cell system 220 exceeds the reference value, but the failure does not occur in the thermal management system or the cooling system, the controller 60 may be configured to operate the FCU of the first fuel cell system 220 to drive the cooling-water pump to a maximum level, and open a temperature control valve to a maximum level, and drive the fan to a maximum level. In other words, the controller 60 may be configured to transmit a maximum cooling control signal to the FCU of the first fuel cell system 220.

In an exemplary embodiment of the present disclosure, the above configuration is described for ease of understanding, but the number of valves and the number of valve drivers do not affect a gist of the present disclosure. In particular, when the skilled person to the art refers to the above configuration, he/she may have no difficulty in applying the present disclosure to a fuel cell-based generator system equipped with more valves and valve drivers.

Figure 2:
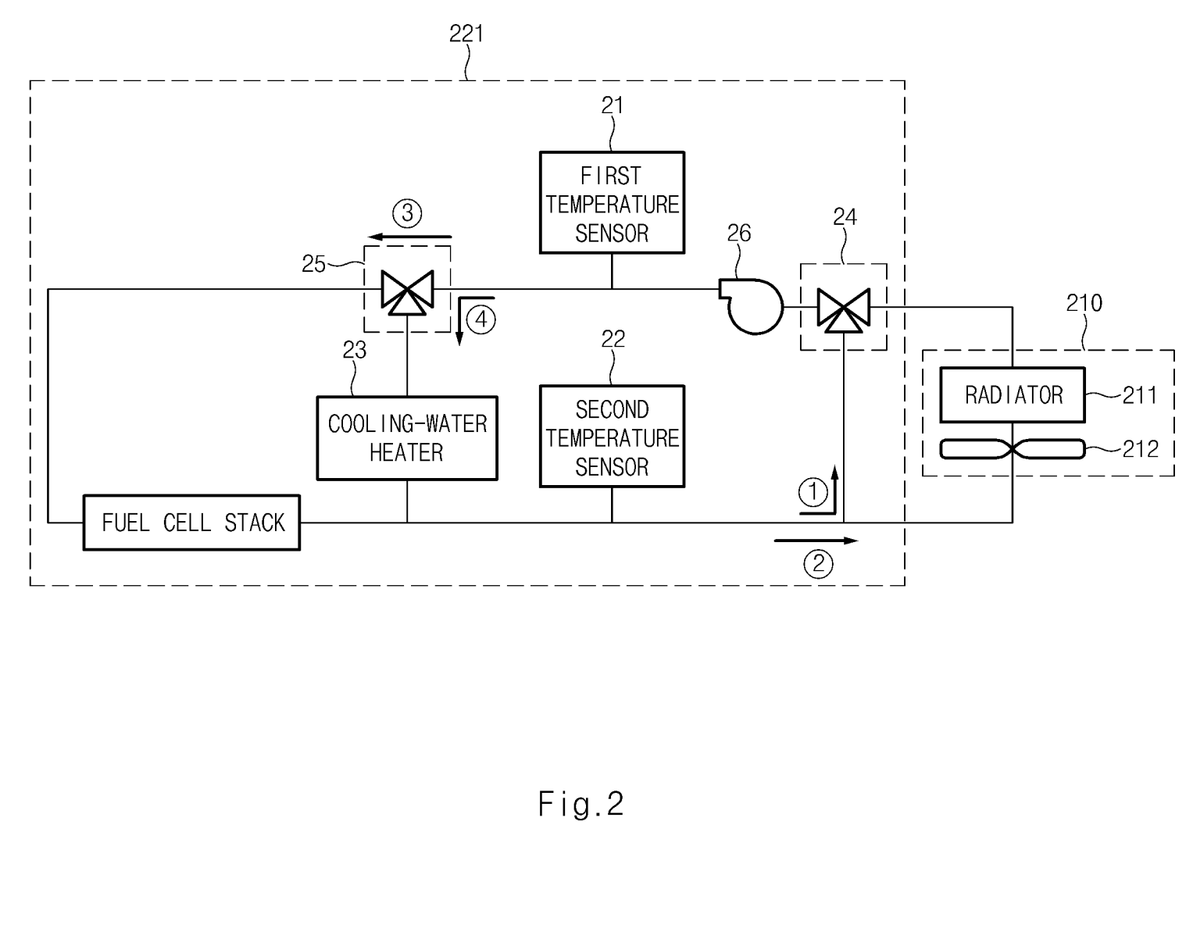
FIG. 2 is a view showing a structure of a thermal management system and a cooling system provided in a fuel cell-based generator system to which an exemplary embodiment of the present disclosure is applied.

FIG. 2 is a view showing a structure of a thermal management system and a cooling system provided in a fuel cell-based generator system to which an exemplary embodiment of the present disclosure is applied. As shown in FIG. 2, a reference numeral '221' represents a thermal management system, and a reference numeral '210' represents a cooling system.

A first temperature sensor 21 may be disposed at a cooling-water outlet line of a cooling pump 26 to measure a temperature of the cooling-water. A second temperature sensor 22 may be disposed at a cooling-water inlet line of the cooling pump 26 to measure a temperature of the cooling-water. A cooling-water heater 23 may be disposed in a line branched from a fuel cell stack cooling-water outlet line, and may be configured to heat the cooling-water supplied from the cooling-water pump 26 via a second temperature adjustment valve 25 and discharge the heated cooling water to a cooling-water outlet line of the fuel cell stack.

A first temperature adjustment valve 24 may be disposed between the cooling-water pump 26 and a radiator 211 be configured to supply the cooling-water discharged from the fuel cell stack directly to the cooling-water pump 26 (①) or supply the cooling-water discharged from the fuel cell stack through the radiator 211 to the cooling-water pump 26 (②). The second temperature adjustment valve 25 may be disposed between the cooling-water heater 23 and the cooling-water pump 26 and the fuel cell stack to supply the cooling-water from the cooling-water pump 26 to the fuel cell stack (③), or to supply the cooling-water from the cooling-water pump 26 to the cooling-water heater 23 (④).

The cooling-water pump 26 be configured to circulate the cooling-water along a cooling-water circulation line. The radiator 211 may be configured to release heat of the cooling-water into an atmosphere. The radiator fan 212 may be configured to cool the cooling-water injected into the radiator 211 using wind.

Figure 3:
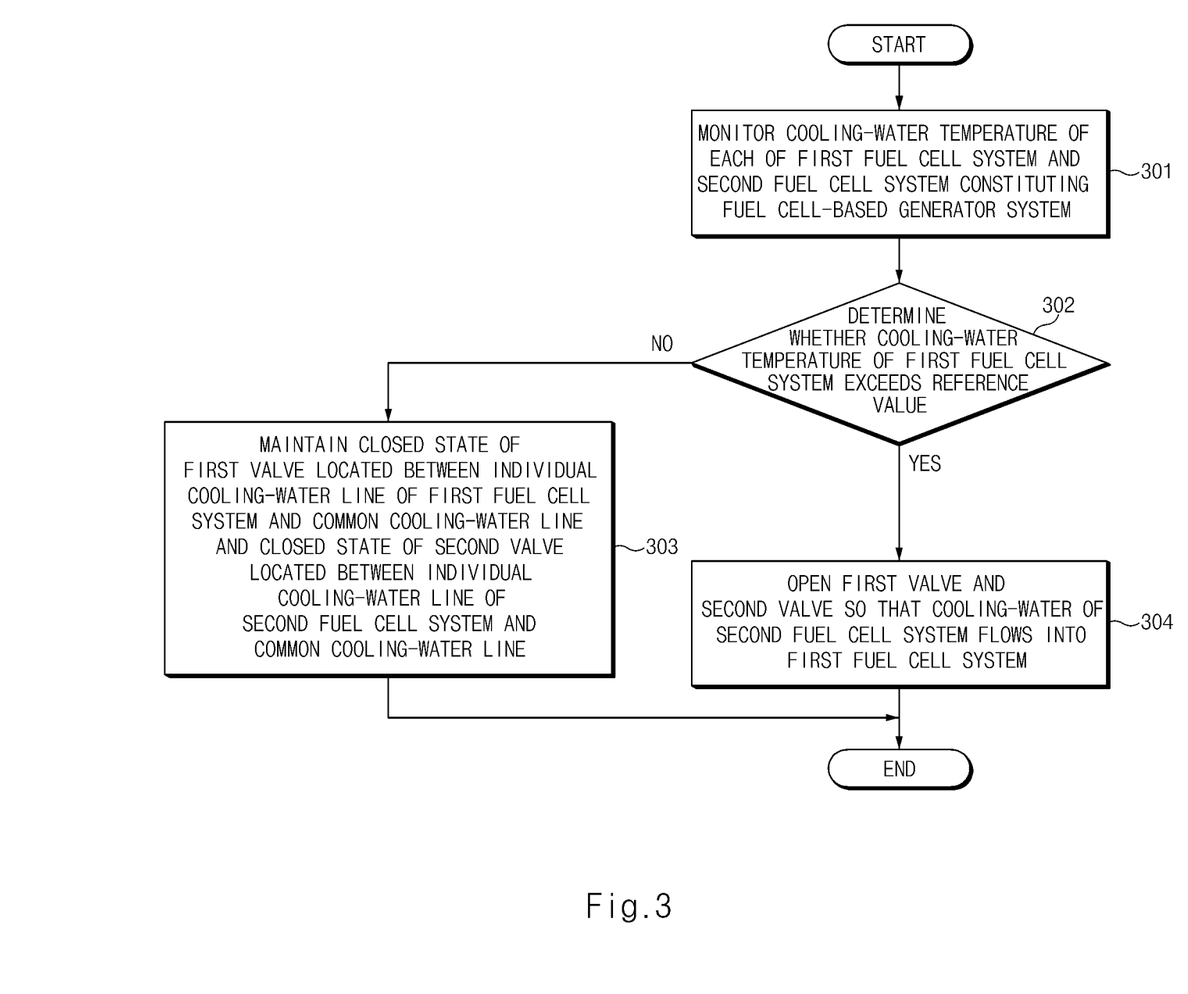
FIG. 3 is a flowchart for a control method of cooling of a fuel cell-based generator system according to an exemplary embodiment of the present disclosure.

FIG. 3 is a flowchart of a control method of cooling of a fuel cell-based generator system according to an exemplary embodiment of the present disclosure. First, the controller 60 may be configured to monitor the cooling-water temperature of each of the first fuel cell system 220 and the second fuel cell system 240 forming the fuel cell-based generator system (301). Thereafter, the controller 60 may be configured to determine whether the cooling-water temperature of the first fuel cell system 220 exceeds the reference value (302).

In response to determining that, based on the determination result (302), the cooling-water temperature of the first fuel cell system 220 does not exceed or is less than the reference value, the controller 60 may be configured to maintain a closed state of the first valve 20 disposed between the individual cooling-water line of the first fuel cell system 220 and the common cooling-water line 110 and a closed state of the second valve 40 disposed between the individual cooling-water line of the second fuel cell system 240 and the common cooling-water line 110 (303). In response to determining that, based on the determination result (302), the cooling-water temperature of the first fuel cell system 220 exceeds the reference value, the controller 60 may be configured to open the first valve 20 and the second valve 40 to allow the cooling-water of the second fuel cell system 240 to flow into the first fuel cell system 220 (304).

Figure 4:
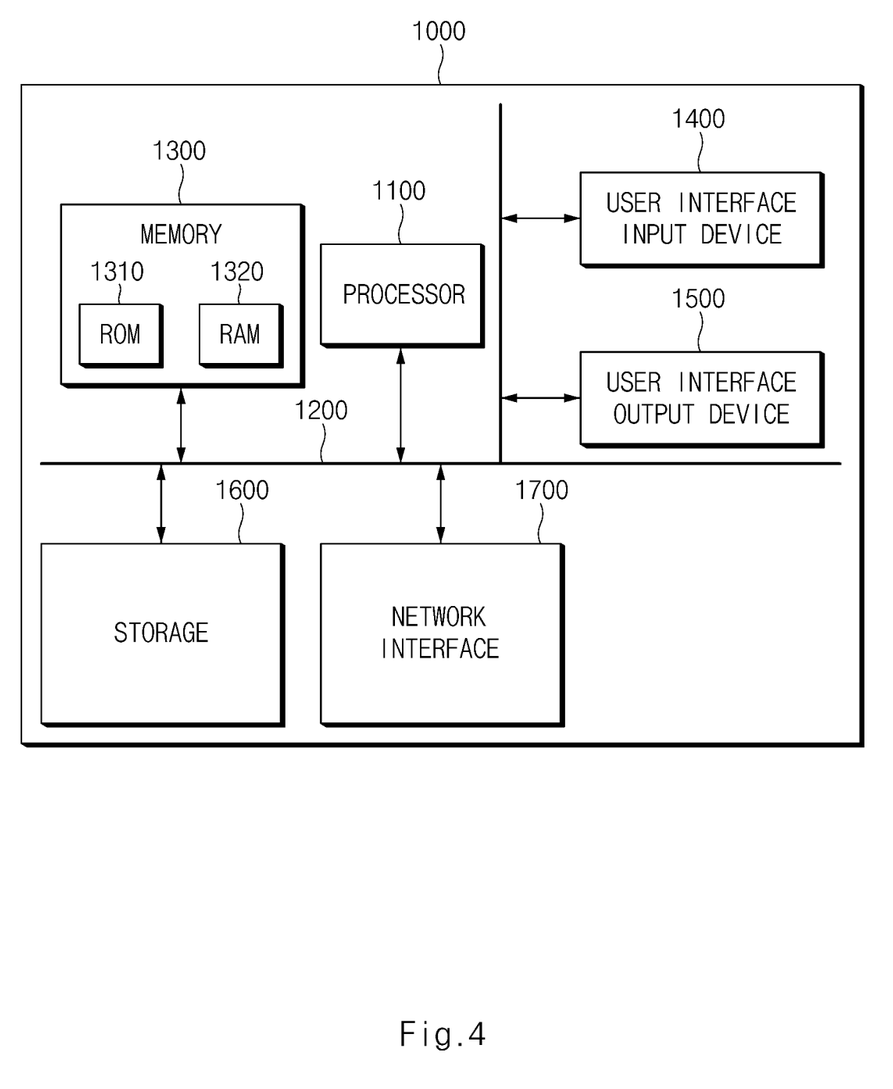
FIG. 4 is a block diagram showing a computing system for executing a control method of cooling of a fuel cell-based generator system according to an exemplary embodiment of the present disclosure.

FIG. 4 is a block diagram showing a computing system for executing a control method of cooling of a fuel cell-based generator system according to an exemplary embodiment of the present disclosure. Referring to FIG. 4, the control method of cooling of the fuel cell-based generator system according to the exemplary embodiment of the present disclosure as described above may be implemented using a computing system. A computing system 1000 may include at least one processor 1100, a memory 1300, a user interface input device 1400, a user interface output device 1500, storage 1600, and a network interface 1700 as connected with each other over a system bus 1200.

The processor 1100 may be a central processing unit (CPU) or a semiconductor device that executes processing of instructions stored in the memory 1300 and/or the storage 1600. Each of the memory 1300 and the storage 1600 may include various types of volatile or nonvolatile storage media. For example, the memory 1300 may include ROM (Read Only Memory) 1310 and RAM (Random Access Memory) 1320. Accordingly, the operations of the method or the algorithm as described in connection with the exemplary embodiments disclosed herein may be embodied directly in a hardware or a software module executed by the processor 1100, or in a combination thereof.

The software module may reside on a storage medium (that is, the memory 1300 and/or the storage 1600) such as a RAM, a flash memory, a ROM, an EPROM, an EEPROM, a register, a hard disk, a removable disk, a CD-ROM. The exemplary storage medium is coupled to the processor 1100 which may read information from, and write information to, the storage medium. In another method, the storage medium may be integral with the processor. The processor and the storage medium may reside within an application specific integrated circuit (ASIC). The ASIC may reside within the user terminal. In another method, the processor and the storage medium may reside as individual components in the user terminal.

The present disclosure may provide the apparatus and the method for controlling cooling of the fuel cell-based generator system, in which the individual cooling-water lines of the cooling systems constituting the fuel cell-based generator system are connected to the common cooling-water line, and each valve is disposed between the individual cooling-water line and the common cooling-water line, and thus, when necessary, the cooling-waters of the cooling systems are commonly used, such that even when the cooling-water temperature of the first fuel cell system exceeds the reference value, the first fuel cell system may be cooled using the cooling-water for the second fuel cell system.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling cooling of a fuel cell-based generator system, comprising:
   a first valve disposed between an individual cooling-water line of a first fuel cell system and a common cooling-water line;
   a first valve driver configured to open and close the first valve;
   a second valve disposed between an individual cooling-water line of a second fuel cell system and the common cooling-water line;
   a second valve driver configured to open and close the second valve; and
   a controller configured to:
      determine whether a cooling-water temperature of the first fuel cell system exceeds a reference value; and
      open the first valve and the second valve to allow cooling-water for the second fuel cell system to flow into the first fuel cell system, in response to determining that the cooling-water temperature of the first fuel cell system exceeds the reference value,
      wherein in response to determining that the cooling-water temperature of the first fuel cell system exceeds the reference value, the controller is configured to determine whether to open the first valve and the second valve based on a diagnosis result regarding a cooling failure of the list fuel cell system, and
      wherein in response to determining that the cooling failure does not occur in the first fuel cell system, the controller is configured to transmit a maximum cooling control signal to the first fuel cell system.

2. The apparatus of claim 1, wherein the controller is configured to normally maintain the first valve and the second valve in a closed state.

3. The apparatus of claim 1, wherein in response to determining that the cooling failure occurs in the first fuel cell system, the controller is configured to open the first valve and the second valve.

4. The apparatus of claim 1, wherein the controller is configured to receive the cooling failure diagnosis result from the first fuel cell system.

5. The apparatus of claim 1, wherein the controller is configured to directly diagnose the cooling failure of the first fuel cell system.

6. The apparatus of claim 1, wherein the controller is configured to determine whether a cooling-water temperature of the second fuel cell system exceeds a reference value, wherein in response to determining that the cooling-water temperature of the second fuel cell system exceeds the reference value, the controller is configured to open the first valve and the second valve to allow cooling-water for the first fuel cell system to flow into the second fuel cell system.

7. A method for controlling cooling of a fuel cell-based generator system, comprising:
   monitoring, by a controller, a cooling-water temperature of each of a first fuel cell system and a second fuel cell system forming the fuel cell-based generator system;
   maintaining, by the controller, a closed state of a first valve disposed between an individual cooling-water line of the first fuel cell system and the common cooling-water line, and a closed state of a second valve disposed between an individual cooling-water line of the second fuel cell system and a common cooling-water line, in response to determining that the cooling-water temperature of the first fuel cell system is less than a reference value; and
   opening, by the controller, the first valve and the second valve to allow cooling-water for the second fuel cell system to flow into the first fuel cell system in response to determining that the cooling-water temperature of the first fuel cell system exceeds the reference value,
   wherein the opening of the first valve and the second valve includes:
   determining, by the controller, whether the first fuel cell system has a cooling failure;
   opening, by the controller, the first valve and the second valve in response to determining that the cooling failure occurs in the first fuel cell system; and
   transmitting, the controller, a maximum cooling control signal to the first fuel cell system in response to determining that the cooling failure does not occur in the first fuel cell system.

8. The method of claim 7, wherein the opening of the first valve and the second valve includes receiving the cooling failure diagnosis result from the first fuel cell system.

9. The method of claim 7, wherein the opening of the first valve and the second valve includes directly diagnosing the cooling failure of the first fuel cell system.

10. A method for controlling cooling of a fuel cell-based generator system, comprising:
    monitoring, by a controller, a cooling-water temperature of each of a first fuel cell system and a second fuel cell system forming the fuel cell-based generator system;
    maintaining, by the controller, a closed state of a first valve disposed between an individual cooling-water line of the first fuel cell system and a common cooling-water line, and a closed state of a second valve disposed between an individual cooling-water line of the second fuel cell system and the common cooling-water line, in response to determining that the cooling-water temperature of the second fuel cell system is less than a reference value; and opening, by the controller, the first valve and the second valve to allow cooling-water for the first fuel cell system to flow into the second fuel cell system when the cooling-water temperature of the second fuel cell system exceeds the reference value, wherein the opening of the first valve and the second valve includes:

determining, by the controller, whether the second fuel cell system has a cooling failure;

opening, by the controller, the first valve and the second valve in response to determining that the cooling failure occurs in the second fuel cell system; and transmitting, the controller, a maximum cooling control signal to the second fuel cell system in response to determining that the cooling failure does not occur in the second fuel cell system.

\* \* \* \* \*